June 10, 1930.　　　　K. DAVIS　　　　1,762,765

CABLE ACTUATING MECHANISM

Filed Aug. 21, 1924　　　5 Sheets-Sheet 1

June 10, 1930. K. DAVIS 1,762,765
CABLE ACTUATING MECHANISM
Filed Aug. 21, 1924 5 Sheets-Sheet 2

INVENTOR
K. Davis
BY John D. Morgan
ATTORNEY

June 10, 1930. K. DAVIS 1,762,765
CABLE ACTUATING MECHANISM
Filed Aug. 21, 1924 5 Sheets-Sheet 3
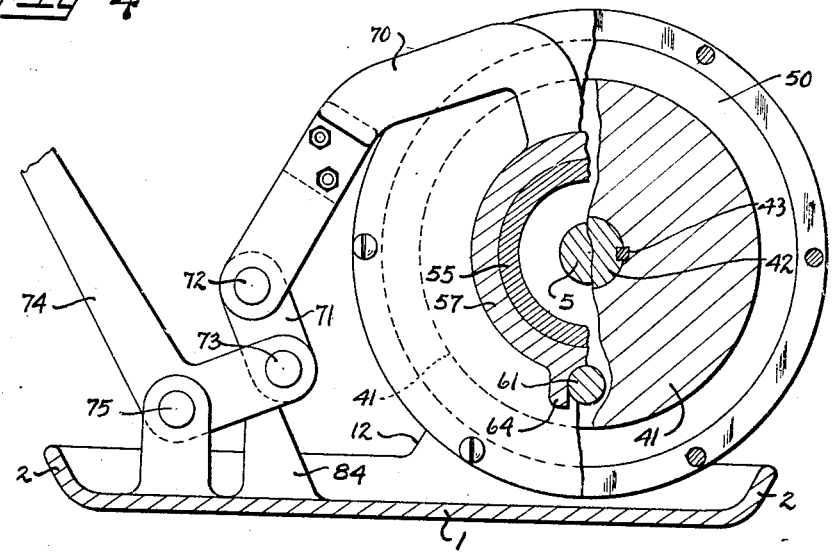
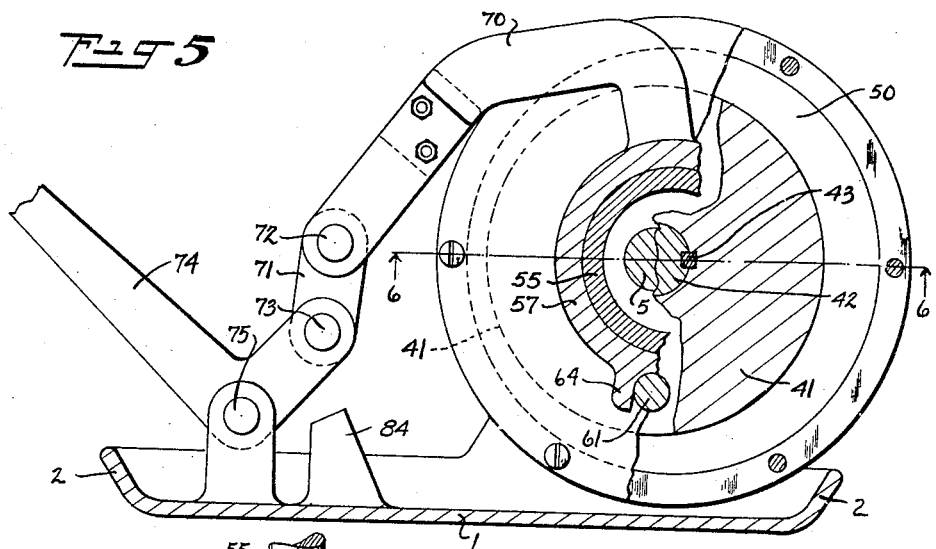
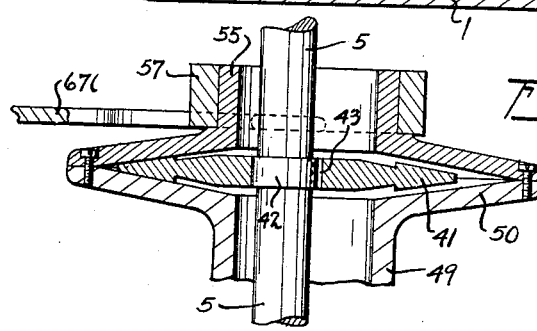

June 10, 1930.　　　　K. DAVIS　　　　1,762,765
CABLE ACTUATING MECHANISM
Filed Aug. 21, 1924　　　5 Sheets-Sheet 4
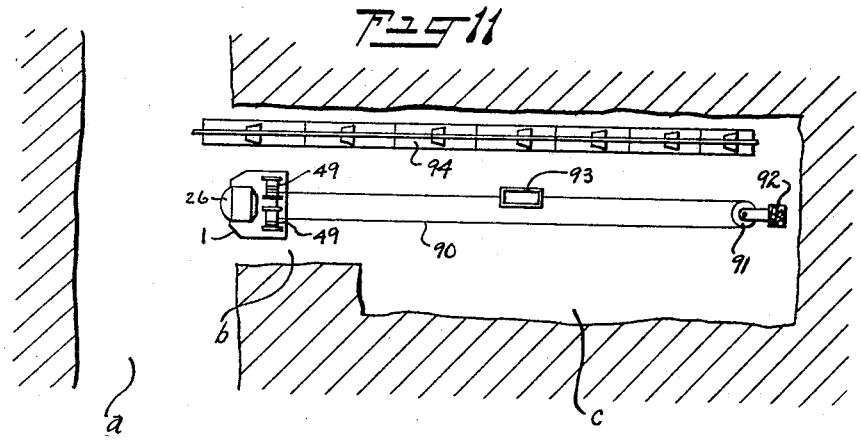
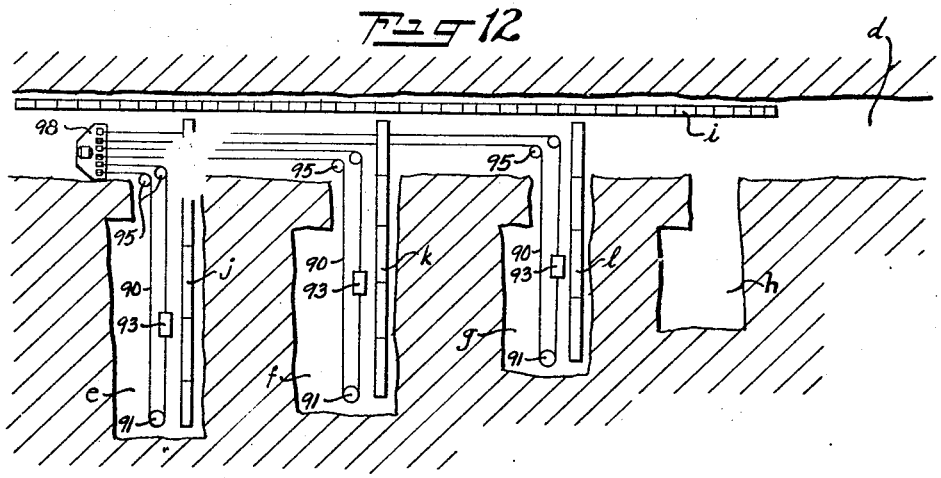
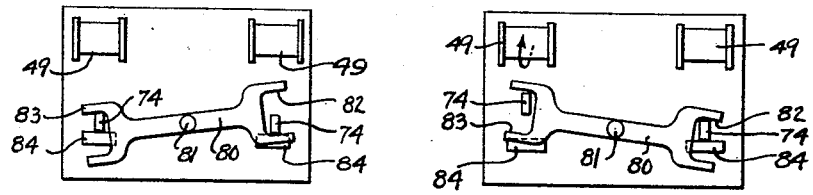
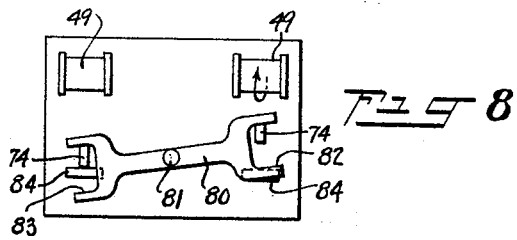
INVENTOR
K. Davis
BY John R. Morgan
ATTORNEY

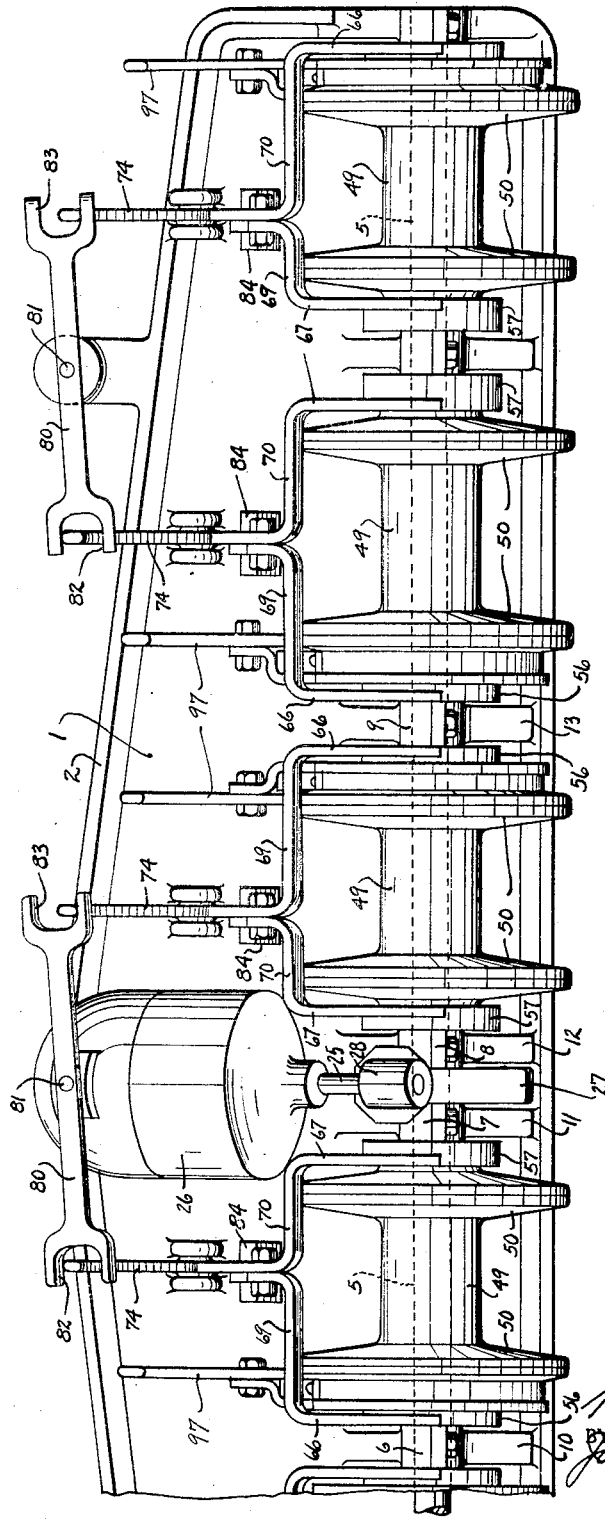

Patented June 10, 1930

1,762,765

UNITED STATES PATENT OFFICE

KENNETH DAVIS, OF ST. BENEDICT, PENNSYLVANIA, ASSIGNOR, BY MESNE ASSIGN-
MENTS, TO REMBRANDT PEALE, W. SANDERS DAVIES, AND WILLIAM S. WALLACE,
TRUSTEES

CABLE-ACTUATING MECHANISM

Application filed August 21, 1924. Serial No. 733,327.

The invention relates to a novel cable winding or actuating mechanism, and in certain of its features, more especially to novel driving and controlling means therefor.

Objects and advantages of the invention will be set forth in part hereinafter, and in part will be obvious herefrom, or may be ascertained through practice with the invention; and are realized and attained by means of the instrumentalities and combinations pointed out in the appended claims.

The invention consists in the novel parts, arrangements, constructions, combinations and improvements herein shown and described.

The accompanying drawings, herein referred to and constituting a part hereof, illustrate one embodiment of the invention, and together with the description serve to explain the principles thereof.

Of the drawings:

Fig. 4 is a partial vertical section and partial elevation, taken on the line 4—4 of Fig. 1;

Fig. 5 is a similar view to Fig. 4, and showing the parts in the clutching or drum-driving position;

Fig. 6 is a fragmentary horizontal section taken on the line 6—6 of Fig. 5;

Figs. 7, 8 and 9 are diagrammatic figures, showing the operation of the control mechanism for the drums;

Fig. 10 is a plan showing a plurality of pairs of drums, with a common driving mechanism;

Fig. 11 is a diagrammatic horizontal section showing the invention working in a mine room; and Fig. 12 is a similar diagram showing a mechanism operating in a mine entry and in a plurality of rooms.

Figure 1:
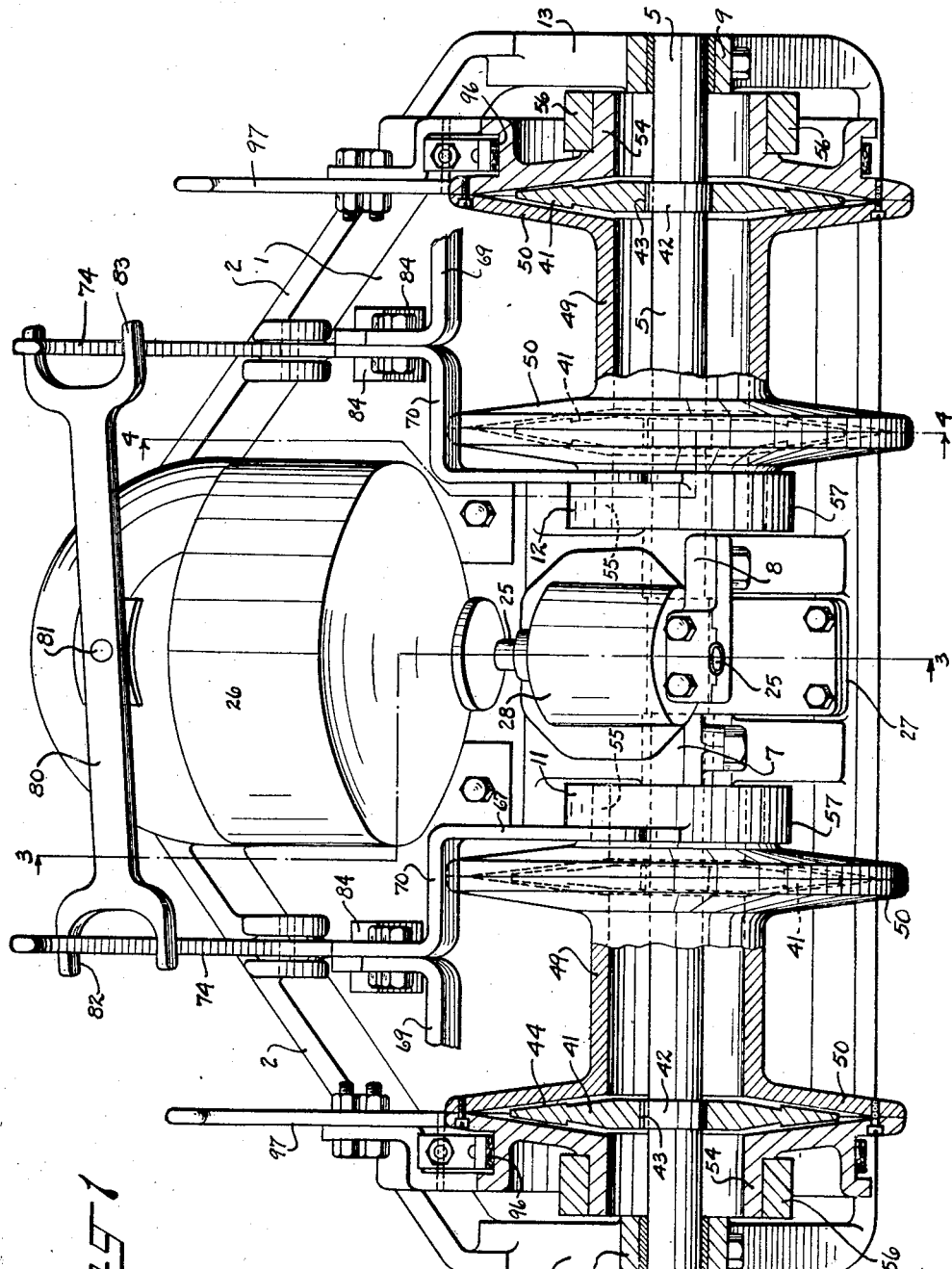
Fig. 1 is a top plan of a mechanism embodying the invention, and showing certain parts in horizontal section.
Figure 2:
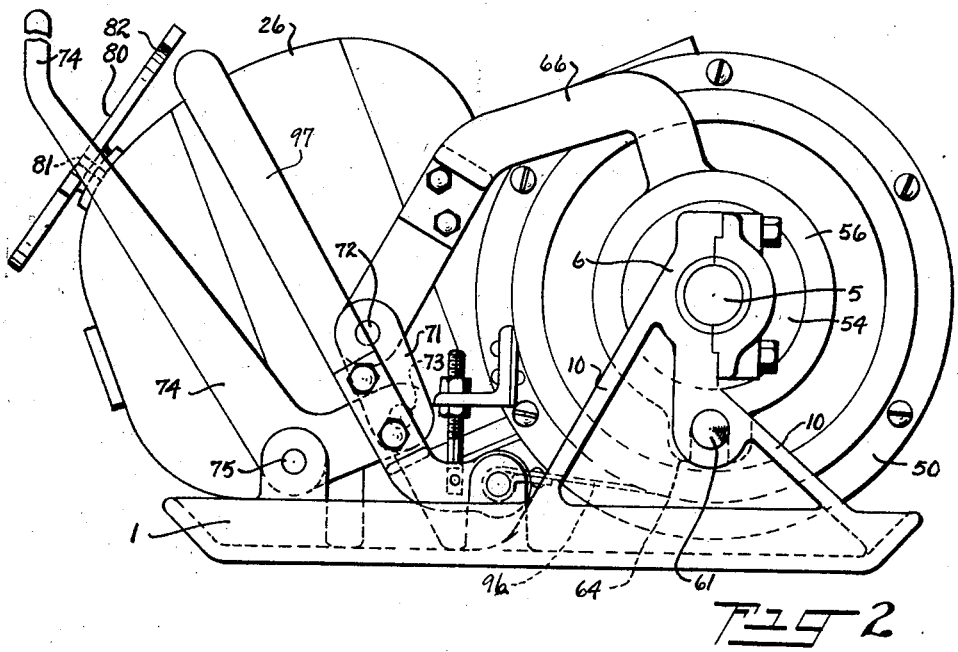
Fig. 2 is an end elevation, looking at Fig. 1 from the bottom of the sheet.
Figure 3:
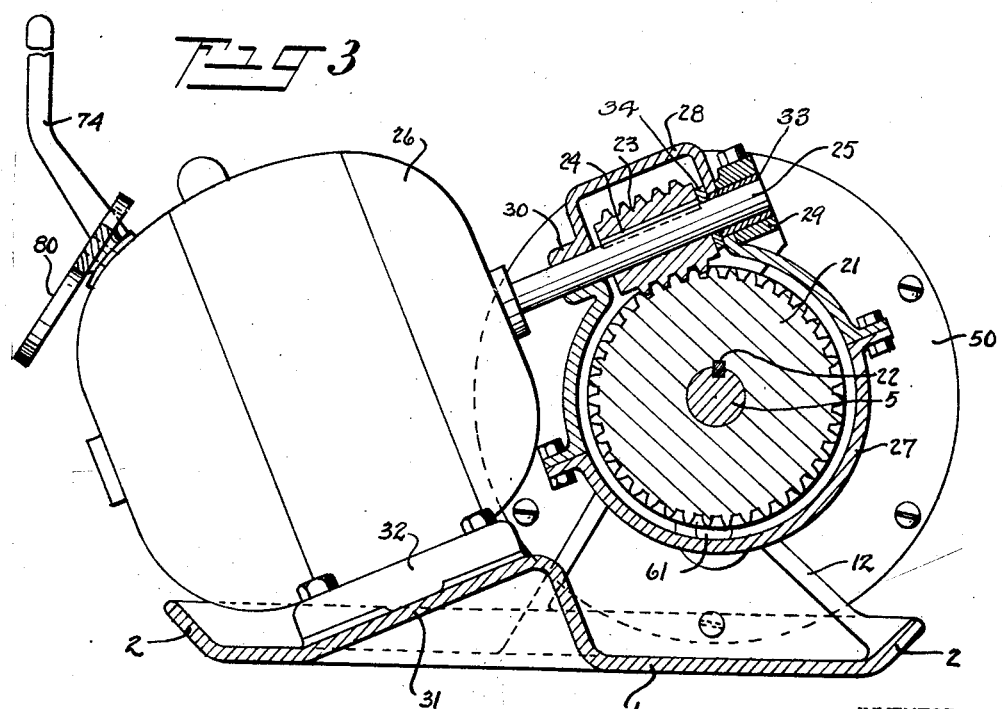
Fig. 3 is a partial vertical section and partial elevation, taken on the line 3—3 of Fig. 1.

The invention is directed to providing a cable winding mechanism which finds one extensive field of usefulness in the propulsion or traction of loads, the winding mechanism being preferably electrically driven and constituting a self-contained unit, adaptable to be transported from place to place, and being of very compact, and especially of low design. It is thereby especially capacitated for use in mines, and especially in thin coal veins.

One exceedingly valuable adaptation of the invention is its use in connection with the mining of low coal seams, wherein the coal is conveyed out of the mine by means of automatically operated conveying mechanism, such for instance as is shown in my copending application Serial No. 716,323 filed May 28, 1924. The present invention is used in such instance for carrying into the low rooms roof props and other supplies, and for conveying out of the rooms rock or any other materials other than the coal which is conveyed out by the conveyer mechanism. The low compact and self-contained unit adapts the device or mechanism to such use, and it may be moved or transferred from one room to the other with relatively small effort and expense.

The invention is also adaptable to other wide uses wherein loads are moved by cable, and especially where the mechanism is operated and controlled by low grade attendants, as the controls are interlocking and fool proof. Also even such low grade attendants are capable of operating quite an extensive battery of the winding mechanisms with practically no risk of operating complications or mechanical inquiry or damage.

Referring first broadly to the present preferred embodiment of the invention, a rotatable shaft has a plurality of radially outwardly decreasingly tapered disc-like members fixed thereon to rotate therewith, the shaft being driven by suitable means, such as a motor, a worm and worm wheel. A hollow drum encircles the shaft, the drum having hollow radially outwardly decreasingly tapered flanges enclosing two of the tapered or bevelled disc-like members on the shaft, but with clearance therebetween, the hollow interior of the flange being of similar form to the driving discs.

The hollow hubs of the drums are rotatively mounted in a pair of supports, which supports in turn have an eccentric pivotal mounting, and by slight movement of these supports the inner portions of the drum flanges are moved from concentric to slightly eccentric position with reference to the discs on the shaft. In the eccentric position the interiors of the drum flanges are clutched by the driving discs, and are thereby rotatively driven with the shaft. In the concentric position with reference to the driving discs, the drum flanges are clear of the discs, and the drum is at rest on the supports.

It will be understood that the movement of the drum between the concentric and the eccentric positions may be very slight. A plurality of drums may be mounted upon a single shaft, the shaft being driven by a single motor, and the control for these drums may be interlocked so that while a pair of cooperating drums may be in neutral or inoperative position, the drums may not be thrown into clutch together but only alternatively.

It will be understood that the foregoing general description of the present preferred embodiment, and the following detailed description thereof as well, are exemplary and explanatory of the invention but are not restrictive thereof; and that certain of the advantages of the invention will be primarily set forth in connection with the following detailed description.

Referring now in detail to the present preferred embodiment of the invention, illustrated by way of example in the accompanying drawings, a bed plate 1 is provided which may have the outer edges 2 thereof inclined upwardly, to form a pan or container for oil or grease. A shaft 5 is mounted in a plurality of bearings 6, 7, 8 and 9, formed in corresponding pedestals 10, 11, 12 and 13, which are integral with or supported by base plate 1, and extending upwardly therefrom.

The shaft is driven, preferably continuously, by suitable means, and as embodied a worm wheel 21 is fixed on shaft 5 by a key 22. Meshing with the worm wheel is a worm 23, fixed by a key 24 to the shaft 25 of an electric motor 26. The worm wheel 21 is enclosed within a split cylindrical housing 27, integral with or supported by the pedestals 11 and 12, already described. The worm 23 is enclosed in an extension 28 of the housing 27, and the shaft 25 is journalled in bearings 29 and 30, formed in the walls of the part 28 of the housing.

A friction sleeve 33 and a thrust washer 34 are preferably employed in the bearing. The motor is preferably mounted directly upon the bed plate 1, and for this purpose a portion 31 of the bed plate is upwardly and forwardly inclined, the base 32 of the motor being bolted thereto. The motor shaft is thus inclined forwardly and upwardly, so that the worm comes on the top of the worm wheel, but the motor casing is practically of no greater height than the motor shaft.

The driving mechanism for the drum, as embodied, comprises the disk-like bevelled members already referred to. As embodied a disc-like member 41 is fixed on a slightly enlarged portion 42 of the shaft 5, to rotate therewith by suitable means, such as one or more keys 43. There are preferably two of these clutching and driving discs for each drum. These disc-like members are bevelled radially decreasingly outwardly on both faces, as will best be seen from Figs. 1 and 6, and if desired there may be a concentric annular portion, bevelled to a greater degree, extending part of the radial distance outwardly so as to constitute a double bevelled annular operating clutching portion 44 on the outer part of, and around, the disc.

The drum 49 has a hollow cylindrical winding portion enclosing the shaft 5, preferably with large clearance therebetween. The drum is formed with large hollow flanges 50 at either end thereof, these flanges enclosing a pair of the clutching and driving discs 41 already described. The inner surfaces of the hollow drum flanges are of approximately the same form as the clutching and driving discs 41, but are of sufficiently greater size so as to permit the movement of the drum to and fro between the concentric and eccentric positions, that is, between the idle or declutched position and the operating or clutched position.

The embodied means for giving the drum the slight motion to and fro between the concentric and eccentric positions comprises a pair of concentric, hollow cylindrical hubs, extending outwardly at either side from the respective hollow flanges 50 of the drum. These hubs 54 and 55 constitute the bearing members for the drum, and are journalled, respectively, in annular supporting members 56 and 57. These supporting members are pivotally mounted, respectively, on supporting pins or stub shafts 61 and 62, mounted respectively in the pedestals for the shaft bearings and projecting inwardly therefrom toward the drum. The respective drum supports or journals are movable to clutch and declutch the drum, and preferably are pivotally mounted upon their respective pins 61 and 62 by means of a fork or yoke 64, formed in the bottom periphery of each of the supports. Thus the drum has a slight rocking action with respect to the shaft 5 and driving discs 41, whereby the drum is clutched to the shaft and declutched therefrom as already described.

Means are provided for moving the pivotally-mounted drum supports 56 and 57, at either side of the drum, in unison, and in the embodied form thereof, arms 66 and 67 respectively, are integral with the supports 56 and 57, respectively, and extend backwardly therefrom beyond the drum flanges. These arms 66 and 67 then are bent inwardly toward each other, as shown at 69 and 70, and are bolted together to form a yoke, whereby the two supports are fixed together and are moved in unison. The embodied form of actuating means is manual, and comprises a link 71, pivoted to the actuating yoke at 72 and pivoted at 73 to one end of a hand lever 74. The hand lever 74 is pivotally mounted at 75 upon the machine frame.

The operation of the mechanism so far described, in its principal essentials, is as follows:

The motor 26, through the worm 23 and the worm wheel 21, rotates the shaft 5 continuously, and therewith the clutching discs 41. The drum 49 is journalled in the movable supports 56 and 57, which have a slight rocking motion about the supporting pivot pins 61 and 62. In the position of Fig. 4, the drum is concentric with the clutching and driving discs 41, and is therefore clear of the discs and the drum is at rest. By moving the lever 74, the drum is given a slight rocking motion from the position of Fig. 4 to that of Fig. 5, and thereby the interior surface of the two hollow drum flanges are wedged against the corresponding discs 41, and the drum is thereby clutched and driven, rotating in the supports 56 and 57. The declutched position of the drum is shown in section in Fig. 1, which corresponds to Fig. 4; and the clutched position is shown in Fig. 6, which corresponds to Fig. 5.

In certain aspects of the invention, the drums are operated in pairs, driven from the shaft 5, and are connected together by suitable mechanism whereby when one drum is thrown into clutch the other drum is declutched. In Fig. 1 a pair of drums, which may both be of the construction already described, are mounted at either side of the worm drive, and the foregoing description is applicable to both. One of these drums is clutched to wind, while the other remains declutched to unwind a cable.

Thereby a single cable may be used, or two cables attached to a car; in either case the cable runs about a sheave at the far end of the path, one end winding on the clutched drum as the other end winds off the loose drum. Thus a car or drag, or other load carrying device, may be run to and fro along a path of any practical desired length, and stopped at any point therealong, by a workman stationed at, and controlling the drum mechanism.

In the embodied form of mechanism for effecting this interlocking control of a pair of drums, the hand control levers 74 of the pair are located at either side of the motor 26. A lever 80 is pivotally mounted at 81 upon the motor casing, and at one end it is provided with a wide yoke 82, straddling one controlling lever 74, and at the other end with a wide yoke 83, straddling the other controlling lever 74. Suitable stops 84 are provided for the control levers in the off or declutched positions. There is a certain amount of play between the arms of the yokes 82 and 83, and the control lever 74. As the lever 80 moves about its pivot 81, it first throws one drum out of action; it then passes through a neutral stage where both drums are out of action, and as it continues its movement throws the second drum into action.

This is best shown in Figs. 7, 8 and 9. In Fig. 7 the yoke lever is shown after the left-hand operating lever 74 has thrown its drum 49 into clutch, and Figure 8 shows the position of the yoke lever 80 after the right-hand control lever 74 has thrown its drum 49 into clutch. It will be clear that with either control lever 74 in clutch, if it is attempted to throw the other lever 74 into clutch, before this lever passes into clutch, the control lever already in clutch will first be brought to neutral position. There will be thus a period when both control levers and both drums will be in neutral or declutched position, and this stage of the mechanism is shown in Fig. 9. It will be clear, therefore, that both drums may be at once in the declutched position but that both drums cannot be at any time simultaneously in the clutched position.

In the present embodiment it will be noted that the pivotal and rocking supports 56 and 57 for the drum hubs 54 and 55 rock slightly downwardly off center to the declutched position and that the movement into the clutching position is in the direction of strain of the load. The load, therefore, tends to maintain the working drum in clutched position, and the idle drum will remain in its position, but the leverage is such that the control lever will easily throw it out.

In Fig. 10 is shown a plurality of pairs of drums 49, driven from a single shaft 5, and the two drums of each pair being connected up so that the drums are interlocked, like the pair already described, whereby both drums may not at any time be in clutching position together. The yoke levers in this case, except the central one, are mounted upon any suitable support.

In Figs. 11 and 12 the application of the invention to a mine entry and rooms is shown diagrammatically and exemplarily.

In Fig. 11 a unit comprising a single pair of interlocked drums is shown at the mouth $b$ of a mine room $c$, opening off the entry $a$. A cable 90 is wound onto one drum, and extends into the room, and near the face of the room runs upon sheave 91, mounted on a post 92. A car 93 is attached to the cable, and the other end of the cable is wound on the other drum of the pair or couple. This mechanism operates in the manner described, that is, either drum working and winding, and the other drum loose and unwinding. An automatic coal conveyor 94 is shown in the room, extending longitudinally thereof, and alongside the cable mechanism.

In Fig. 12 a plurality of rooms $e, f, g$ and $h$ are shown, opening off the entry $b$, there being a trackway or automatic conveyor $i$ in the entry and automatic conveyors $j, k,$ and $l$ in the rooms, respectively. The mechanism for the single cable conveyor in the room is substantially the same as in Fig. 11, and the automatic coal conveyor may be the same. Where a plurality of room cables are operated from one driving mechanism, the various cables 90 run about sheaves 95, and are connected up with a plurality of pairs of drums 98, which may be similar to the unit shown in Fig. 10.

A suitable brake mechanism including a brake band 96 and an actuating lever 97 may be provided.

The term "transversely" as used in the claims means across the axis of rotation, as distinct from a movement parallel to such axis.

From all the foregoing it will be understood that mechanism and means are provided by the invention, realizing the objects and advantages herein set forth, together with other objects and advantages; and it will be further understood that departures may be made from the details of mechanism herein shown and described, within the scope of the accompanying claims limited only as may be necessary by the prior art, without departing from the principles of the invention and without sacrificing its chief advantages.

What I claim is:—

1. A cable actuating mechanism including in combination a hollow winding drum, a driven shaft, a driving member within the hollow drum and substantially coaxial therewith and fixed to the shaft, means for changing transversely the axial relation between the drum and driving member to drive the drum, a similar drum and driving means therefor, and means mechanically interconnecting the shifting members on each drum for preventing the simultaneous driving of the two drums.

2. A cable actuating mechanism including in combination a drum, a motor and shaft driven thereby, tapered driving discs mounted on the shaft, a movable support, a drum on the support and surrounding the shaft, hollow tapered members on the drum surrounding the discs, and means for eccentrically moving the support to move the drum members into and out of engagement with the driving discs.

In testimony whereof, I have signed my name to this specification.

KENNETH DAVIS.